United States Patent
Ibrahim et al.

(10) Patent No.: US 10,958,162 B1
(45) Date of Patent: Mar. 23, 2021

(54) DUAL-LOOP REGULATED SWITCHED CAPACITOR DC-DC CONVERTER

(71) Applicant: Vidatronic, Inc., College Station, TX (US)

(72) Inventors: Sameh Assem Ibrahim, Cairo (EG); Mohammad Ahmed Radwan, Cairo (EG); Michael A Nix, College Station, TX (US)

(73) Assignee: Vidatronic, Inc., Austin, TX (US)

( * ) Notice: Subject to any disclaimer, the term of this patent is extended or adjusted under 35 U.S.C. 154(b) by 0 days.

(21) Appl. No.: 16/732,292

(22) Filed: Dec. 31, 2019

(51) Int. Cl.
*H02M 3/07* (2006.01)
*H02M 3/156* (2006.01)

(52) U.S. Cl.
CPC ............. *H02M 3/07* (2013.01); *H02M 3/156* (2013.01)

(58) Field of Classification Search
CPC .......... H02M 3/06; H02M 3/07; H02M 3/156; H02M 3/1563; H02M 3/155; H02M 3/157; H02M 3/158; H02M 3/1582
See application file for complete search history.

(56) References Cited

U.S. PATENT DOCUMENTS

| | | | | |
|---|---|---|---|---|
| 6,762,634 B1* | 7/2004 | Hattori | ...................... | H03L 7/07 327/159 |
| 7,746,178 B1* | 6/2010 | Humphreys | ............ | H03L 7/085 331/1 A |
| 9,379,731 B1* | 6/2016 | Roham | ..................... | G01K 7/16 |
| 9,998,010 B1* | 6/2018 | Ibrahim | .................. | H02M 3/07 |
| 10,488,875 B1* | 11/2019 | Olieman | ................. | G05F 1/461 |
| 2011/0101938 A1* | 5/2011 | Ma | .......................... | H02M 3/07 323/282 |

* cited by examiner

*Primary Examiner* — Adolf D Berhane
(74) *Attorney, Agent, or Firm* — Liang Legal Group, PLLC (57) ABSTRACT

A dual loop regulated switched-capacitor converter circuit includes a switched capacitor array that includes a plurality of switches and capacitors; a digital controller for controlling the switched capacitor array; a pulse modulator connected to the digital controller; a clock generator connected to the digital controller; a first comparator connected to the pulse modulator; and a feedback network connected to the first comparator.

24 Claims, 6 Drawing Sheets

DUAL-LOOP REGULATED SWITCHED CAPACITOR DC-DC CONVERTER

BACKGROUND

A switched-capacitor converter is an important module for many electronic circuits and systems. It is used to provide an output DC voltage that can be higher or lower than the input DC voltage. When regulated, it can provide an output DC voltage that is process, supply, and temperature independent, as well as independent of line (input voltage) and load variations.

Traditionally, switched-capacitor converters are used in open-loop configurations. In this configuration, the output voltage is a fixed ratio of the input voltage with no consideration for load variations. However, load variations would increase losses inside the converter and result in output voltage changes. Open-loop converters are thus not suitable for high-accuracy applications that require a fixed voltage. A regulated switched-capacitor converter (with a single conversion ratio) uses a single loop to modulate the converter output impedance such that it keeps the output voltage constant. However, when both load and input voltages vary, a single-loop regulation can result in a high drop in efficiency.

Figure 1:
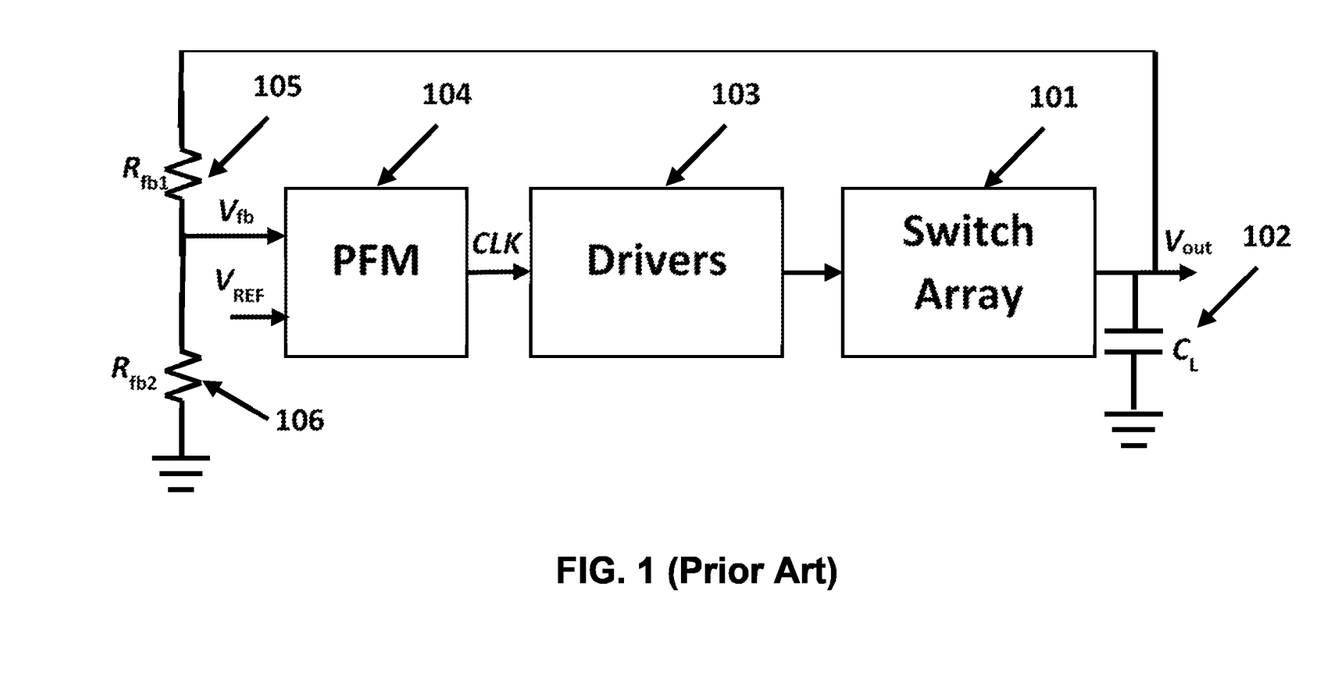
FIG. 1 shows a schematic block level circuit diagram of a prior art single-loop regulated switched-capacitor converter using frequency modulations.

FIG. 1 shows a prior art single-loop regulated switched-capacitor converter circuit. The regulation is controlled by changing the frequency of the clock through a modulation scheme called pulse frequency modulation (PFM). The circuit consists of a switched capacitor array (101) that can be configured for a desired conversion voltage gain. The output voltage is regulated at the load capacitor CL (102). Drivers (103) are needed to drive the switches inside the switched capacitor array (101). A pulse-frequency modulator (PFM) (104) is used to provide the clock (CLK) to the drivers (103). Usually, the PFM (104) will consist of a comparator and an oscillator. It will compare the feedback voltage ($V_{fb}$) to a certain reference voltage ($V_{REF}$) and then determine whether to increase or decrease the frequency to keep $V_{out}$ at the desired voltage level. $V_{fb}$ is obtained by a resistor divider consisting of $R_{fb1}$ (105) and $R_{fb2}$ (106). Changing the frequency of the clock changes the output resistance of the switched capacitor regulator and as such achieves the regulation. However, the regulator will have to try to produce an ideal output voltage higher than the desired voltage because of the switch array output impedance. The loss in voltage due to the output impedance results in the desired voltage; however, power efficiency is reduced by this mechanism.

Figure 2:
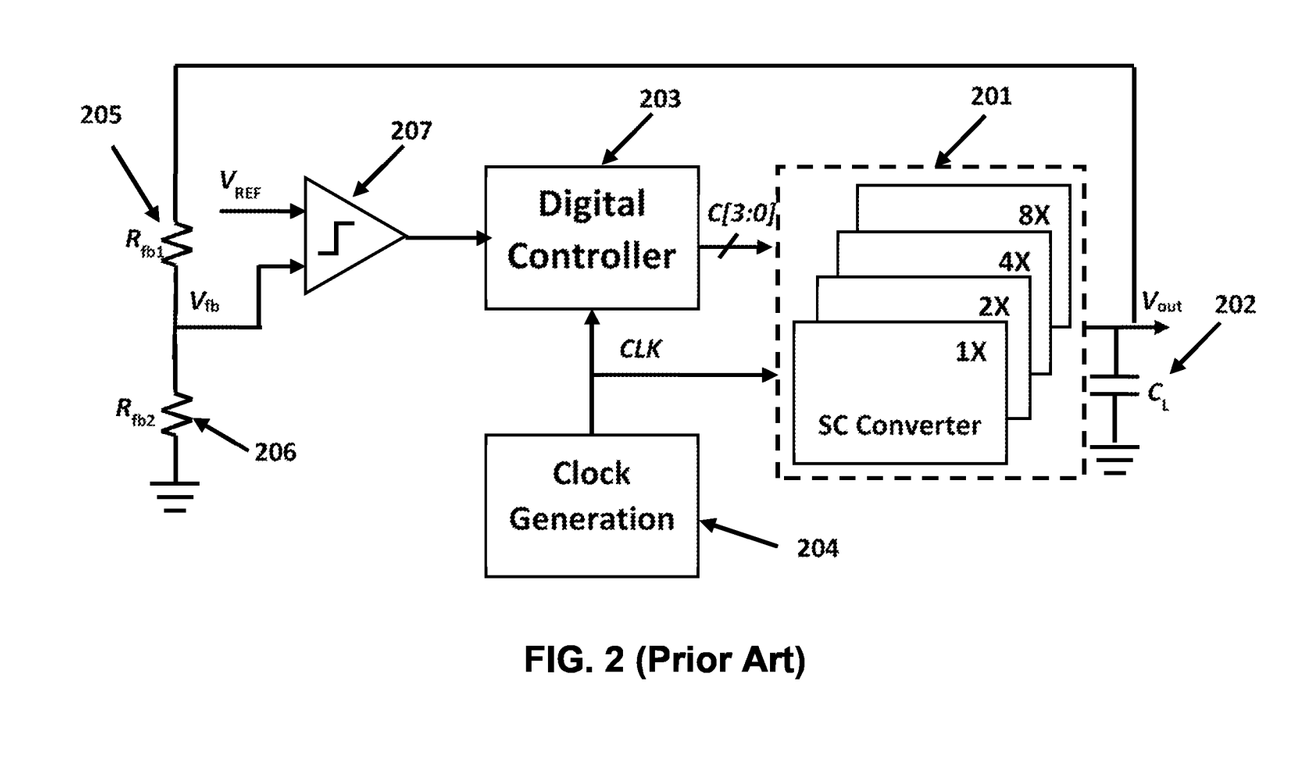
FIG. 2 shows a schematic block level circuit diagram of a prior art single-loop regulated switched-capacitor converter using switch size modulations.

FIG. 2 shows another prior art single-loop regulated switched-capacitor converter circuit. The regulation depends on changing the switched capacitor sizes. The circuit consists of a switched capacitor converter array (201) that can be configured for a desired conversion voltage gain. However, the switched capacitor converter array (201) is typically designed in a binary-weighted structure with four different sizes of the switches and internal flying capacitors (1×, 2×, 4×, and 8×). The output voltage is regulated at the load capacitor CL (202). A digital controller (203) is used to determine the size of the switches to be used via a digital word C[3:0]. The decision is made according to the desired output voltage. This is done by comparing a feedback voltage ($V_{fb}$) and a reference voltage ($V_{REF}$) using a comparator (207). $V_{fb}$ is obtained by a resistor divider consisting of $R_{fb1}$ (205) and $R_{fb2}$ (206). The digital controller (203) increases or decreases the size of the switches of the converter by enabling or disabling converters when the comparator output is Low or High, respectively. The clock needed for the operation (CLK) is generated by a clock generation block (204), which consists of an oscillator and non-overlapping clock generator. The same clock is also used by the digital controller (203). The idea here is that if the load current is low, a smaller converter is needed to avoid large switching and thus large switching losses. As a result, the output resistance of the converter is changed without severely degrading the power efficiency. However, the continuous switching between different sizes can affect the voltage ripples of the converter output.

FIG. 1 and FIG. 2 illustrate prior art regulated switched-capacitor converter circuits where a single regulation loop is used to achieve one voltage conversion ratio. Such converters cannot be used in high-efficiency applications where both the load and input supply may exhibit significant changes. Therefore, there is still a need for better regulated switched-capacitor convertors.

SUMMARY

Embodiments of the invention relate to novel architectures to provide dual-loop regulations for switched-capacitor converters making them suitable for high-efficiency applications where both the load and input supply may exhibit significant changes.

In one aspect, embodiments of the invention relate to dual loop regulated switched capacitor converter circuits. A dual loop regulated switched capacitor converter circuit in accordance with one embodiment of the invention comprises: a switched capacitor array that includes a plurality of switches and capacitors; a digital controller for controlling the switched capacitor array; a pulse modulator connected to the digital controller; a clock generator connected to the digital controller; a first comparator connected to the pulse modulator; and a feedback network connected to the first comparator. The switched capacitor array uses a single-phase clock or a multiple-phase clock. The pulse modulator is used to disable the clock to the switched capacitor array when an output voltage is higher than a desired output value. The pulse modulator is a pulse skipping modulator, a pulse frequency modulator, or a pulse width modulator.

In accordance with embodiments of the invention, the pulse modulator is a pulse skipping modulator and the digital controller is used to enable or disable different units in the plurality of switches and capacitors in the switched capacitor array based on a number of skipped pulses of the pulse modulator using a multi-bit digital word. The digital controller can be used to change a frequency of the clock. The clock generator is used to generate a desired clock signal and its phase. The clock generator consists of an oscillator and a multi-phase clock generation circuit. The comparator is used to compare a scaled version of an output voltage and a reference voltage. The comparator can be clocked or not. The comparator can use an internal or external reference voltage. The comparator generates a signal to be used by the pulse modulator to determine the number of skipped pulses. The feedback network generates a voltage proportional to an output voltage. The feedback network can be implemented using resistors, capacitors, transistors or any combination of them. The feedback network can be implemented on-chip or off-chip.

In accordance with embodiments of the invention, the plurality of switches in the switched capacitor array are implemented as NMOS or PMOS transistors, or npn or pnp bipolar transistors, or NMOS or PMOS FinFET transistors, or a combination thereof. The plurality of capacitors of the switched capacitor array are implemented with transistors, or metal-oxide-metal (MOM) or metal-insulator-metal (MIM) capacitors, or a combination thereof.

In accordance with some embodiments of the invention, a dual-loop regulated switched-capacitor converter circuit may further comprises a second comparator connected to the digital controller. The switched capacitor array further comprises an additional large switched capacitor array unit to be used for heavy load transients. In accordance with embodiments of the invention, "a large switched capacitor" has a capacitance at least twice (preferable at least 5 times, more preferably at least 10 times) that of any capacitance in the original switched capacitor array. The second comparator generates a signal to be used by the digital controller to enable the large switched capacitor array unit.

In accordance with some embodiments of the invention, the first comparator compares a first scaled version of an output voltage and a first reference voltage and the second comparator compares a second scaled version of the output voltage and a second reference voltage, wherein the first scaled version of the output voltage is identical to the second scaled version of the output voltage, and the second reference voltage is lower than the first reference voltage, or wherein the first scaled version of the output voltage is smaller than the second scaled version of the output voltage, and the second reference voltage is identical to the first reference voltage.

In accordance with some embodiments of the invention, a dual-loop regulated switched-capacitor converter circuit may further comprise a third comparator connected to the digital controller. The switched capacitor array further comprises a second large switched capacitor array unit of a different size to be used for a different heavy load transient.

Other aspects of the invention would become apparent with the following description and the attached drawings.

BRIEF DESCRIPTION OF DRAWINGS

The appended drawings illustrate several embodiments of the invention and are not to be considered limiting of its scope, for the invention may admit to other equally effective embodiments.

DETAILED DESCRIPTION

Aspects of the present disclosure are shown in the above-identified drawings and are described below. In the description, like or identical reference numerals are used to identify common or similar elements. The drawings are not necessarily to scale, and certain features may be shown exaggerated in scale or in schematic in the interest of clarity and conciseness.

Embodiments of the invention relate to regulated switched-capacitor converter circuits with dual-loop regulations. A dual-loop regulation may involve two controls: a pulse modulation control and a digital switch converter size control. In accordance with embodiments of the invention, a pulse modulation (e.g., pulse-skipping modulation, pulse frequency modulation, or pulse width modulation) loop may be used for output voltage regulation, and a digital controller may be used for changing the switch sizes of the converters to provide output voltage regulation. With dual-loop regulations in accordance with embodiments of the invention, a regulated switched-capacitor converter would not suffer from very low power efficiency when the load and the input supply vary significantly.

In accordance with embodiments of the invention, a switched capacitor converter circuit can be implemented on a microchip, such as a semiconductor integrated circuit, or can be implemented out of discrete components. In one or more embodiments, a switched capacitor converter circuit of the invention can use on-chip or off-chip capacitors. When implemented as on-chip capacitors, they can be implemented with transistors, metal-oxide-metal, or metal-insulator-metal capacitors. Throughout this disclosure, the terms "switched capacitor converter," "charge pump," and "switched capacitor regulator" may be used interchangeably depending on the context.

The following description will use specific examples to illustrate embodiments of the invention. However, those skilled in the art, with the benefit of this disclosure, would appreciate that same or similar features may be equally applicable to any system, the operation of which requires a high-efficiency, regulated switched-capacitor converter.

Figure 3:
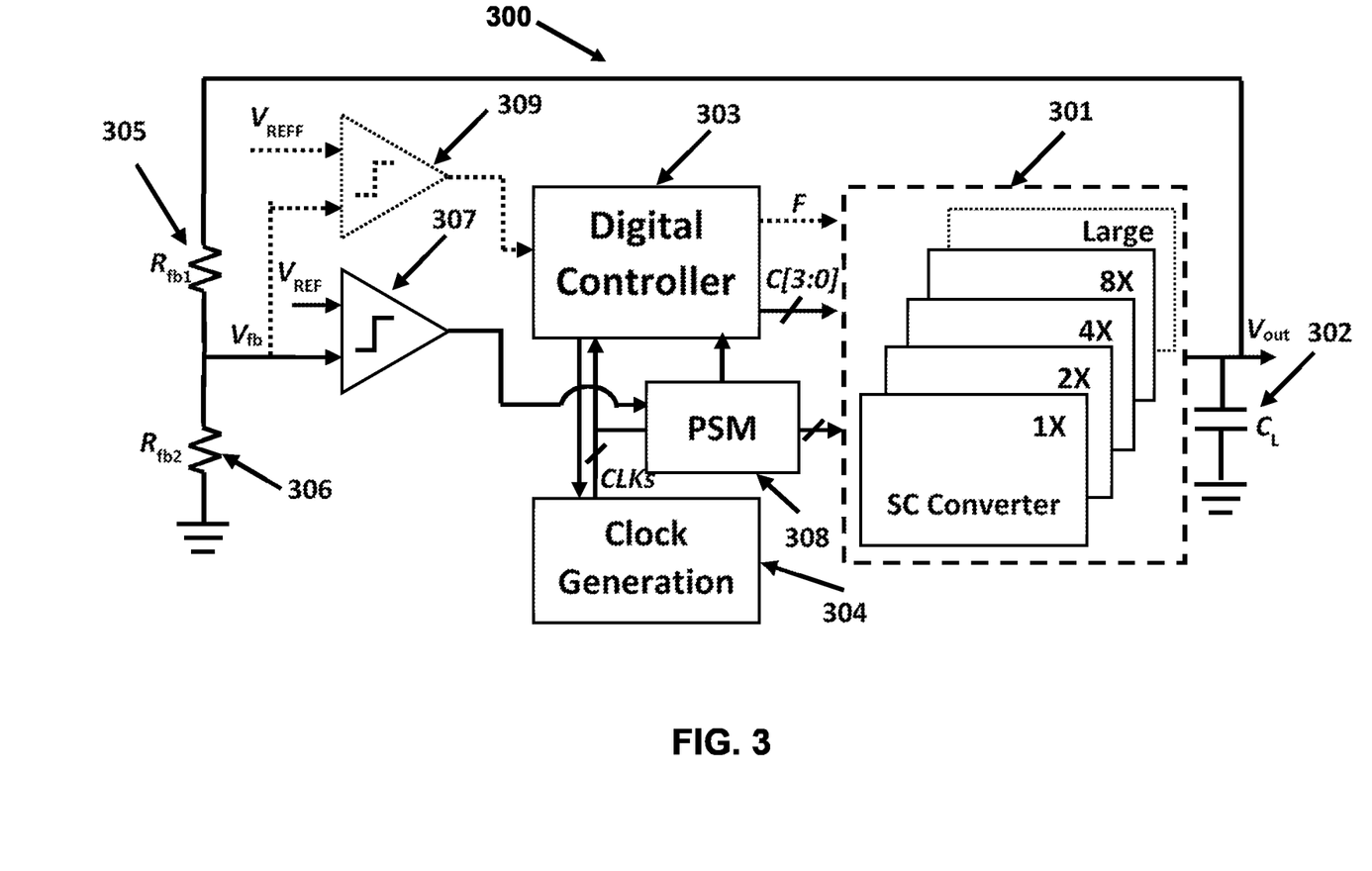
FIG. 3 shows a schematic block level circuit diagram of a dual-loop regulated switched-capacitor converter using pulse modulation (e.g., pulse skipping modulation) and a digital controller in accordance with one embodiment of the invention.

FIG. 3 shows a schematic block-level diagram of an exemplary dual-loop switched capacitor converter (300) in accordance with one embodiment of the invention. The circuit consists of a switched capacitor converter array (301) that can be configured for a desired conversion gain. In this example, the switched capacitor converter array (301) is designed in a weighted (e.g., binary-weighted) structure with four (or other number of) different sizes of the switches and a corresponding number of internal flying capacitors (e.g., 1×, 2×, 4×, and 8×). While this example uses a weighted-capacitor array, embodiments of the invention may include a weighted or non-weighted array with any suitable number of switches and capacitors. In addition, the switched capacitor converter can be configured as a single-phase or multi-phase switched capacitor DC-DC converter. In accordance with embodiments of the invention, an extra-large converter can be added as well to be used for fast transients.

The switches in the switched capacitor array can be implemented as NMOS or PMOS transistors, or NPN or PNP bipolar transistors, or NMOS or PMOS FinFET transistors, or a combination of these. The capacitors in the switched capacitor array can be implemented with transistors (metal-oxide-silicon, MOS, devices), or metal-oxide-metal (MOM) or metal-insulator-metal (MIM) capacitors, or a combination of any or all of these. Furthermore, the switched capacitor array can be implemented as an on-chip or off-chip capacitor array Referring to FIG. 3, the output voltage may be regulated at the load capacitor CL (302). A digital controller (303) is used to determine the size of the switches to be used. For example, a digital word, C[3:0], may be used for an array with four switches and capacitors. If fast load transients exist, a signal F may be used to enable the extra-large converter, which may be included in the switched capacitor converter array (301). The decision as to when to use the extra-large converter may be made according to the desired output voltage. For example, the loop involving the digital word C[3:0] is first used for steady state operation, and the digital word is changed (from C[3:0] to F) only when a large line (input voltage) or load variation exists.

In the example shown in FIG. 3, the main loop consists of the switched capacitor converter array (301), a comparator (307), and a pulse-skipping modulator (PSM) (308). A clock generation block (304) generates the required clock phases (CLKs). The clock can be a single-phase clock or multiple-phase clocks. The comparator (307) compares the feedback voltage ($V_{fb}$), which is generated by a resistor divider consisting of $R_{fb1}$ (305) and $R_{fb2}$ (306), to the reference voltage ($V_{REF}$). The PSM (308) then decides whether to skip some pulses going to the switched capacitor converter array (301) or not, thereby regulating the output voltage ($V_{out}$). The digital controller (303), which can be on-chip or off-chip, keeps track of these skipped pulses. If the switches are too large for the load or the line voltage, many pulses will be skipped. Accordingly, the digital controller (303) may change the size of the converter by changing the digital word C[3:0]. Combining the two controls: pulse modulation (e.g., pulse-skipping) and digital switch size control, optimum regulations can be achieved with minimum voltage ripples on the converter output and better power efficiency.

If a large load current is suddenly applied at the output of the converter, $V_{out}$ may drop significantly, especially if the converter size is at a minimum. Therefore, an optional comparator (309) may be added to detect this voltage drop by comparing $V_{fb}$ to another lower reference $V_{REFF}$. The result can then be used to suddenly enable the extra-large converter in the switched capacitor converter array (301) via the digital controller word F.

In accordance with embodiments of the invention, the switched capacitor array can be implemented with transistors (MOS devices), or metal-oxide-metal (MOM), or metal-insulator-metal (MIM) capacitors, or a combination of all or a combination of two of them. The switches in the switched capacitor array can be implemented as NMOS or PMOS transistors, or npn or pnp bipolar transistors, or NMOS or PMOS FinFET transistors, or a combination of at least two of them.

While the above example uses a pulse-skipping modulation (PSM), the presence of the digital controller (303) allows for the use of other pulse modulators or modulation schemes. One skilled in the art would appreciate that depending on the loads, different pulse modulators (modulation schemes) may be preferred in different conditions in order to achieve high efficiencies. For example, a pulse-width modulator (PWM) would be preferred for heavy loads, a pulse-frequency modulation (PFM) would be preferred for light loads, and a pulse-skipping modulation (PSM) would be preferred for very light loads. In this description, any of these modulators (PWM, PFM, or PSM) may be referred to generically as a "pulse modulator." These pulse modulators may be implemented on-chip or off-chip. In accordance with embodiments of the invention, a switched capacitor converter circuit may employ one or more pulse modulator. For example, a dual-loop switched capacitor converter circuit of the invention may include one modulator (PWM, PSM, or PFM), two modulators (a combination of PWM, PSM, or PFM), or three modulators (PWM, PSM, or PFM). When multiple (two or more) pulse modulators are used, the digital controller (303) may be configured to select a proper pulse modulator to use depending on the load conditions.

Figure 4:
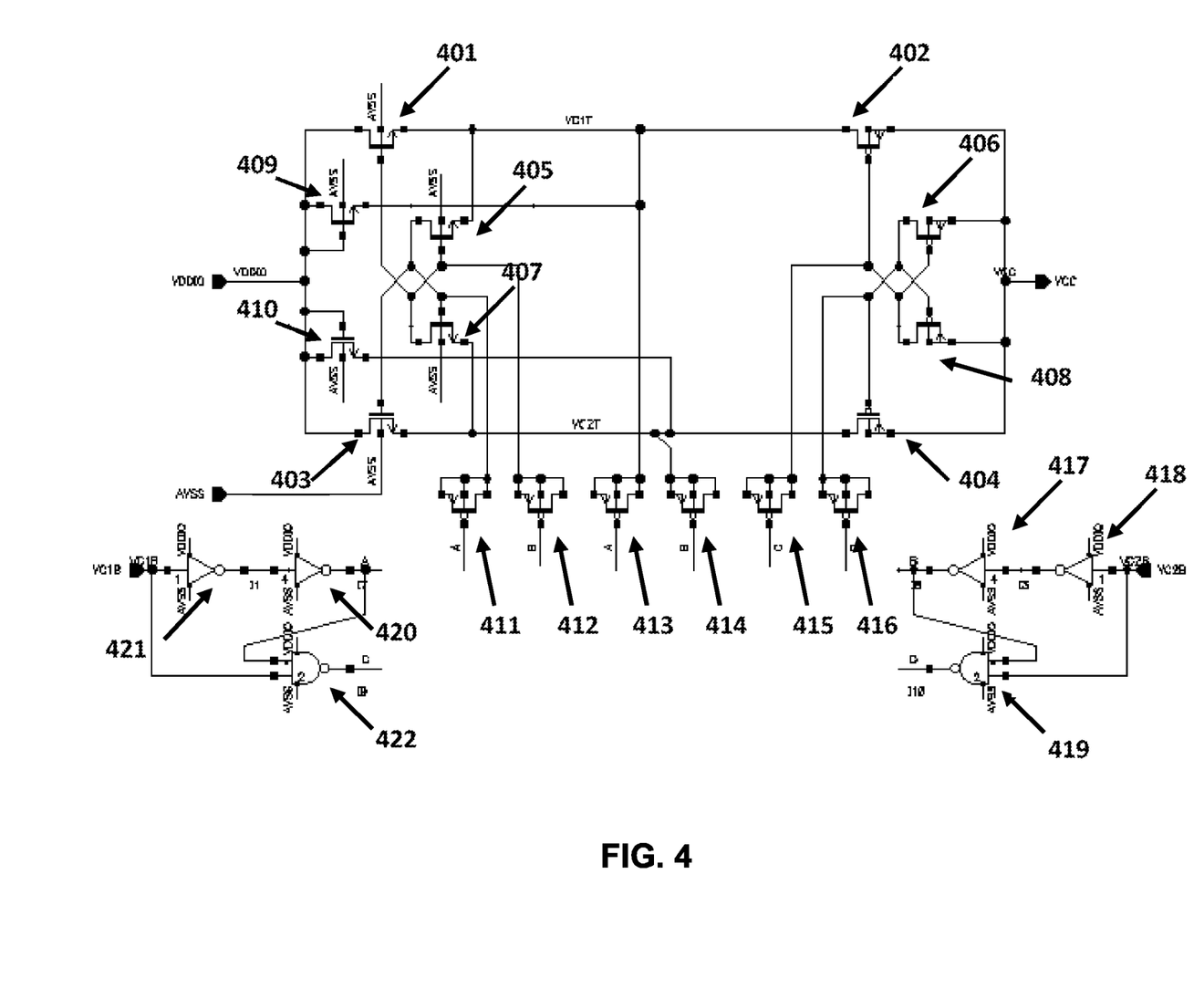
FIG. 4 shows an exemplary circuit diagram of a switched-capacitor voltage doubler.

FIG. 4 shows an example of a possible implementation of a switched capacitor converter circuit that can be used in a dual loop regulated switched capacitor converter. In this implementation, the conversion ratio is 2 acting as a voltage doubler. Transistors (401) to (404) form a conventional cross-coupled voltage doubler. Transistors (405) to (408) form an auxiliary charge pumps to bootstrap the main doubler switches, thereby reducing the switch resistance. Transistors (409) and (410) kick start the circuit and avoid an all-zero solution. Transistors (411) to (416) form on-chip flying capacitors needed by the charge pumps. Digital gates (417) to (422) act as drivers for the switches and shape the clock waveforms for better power efficiency. One skilled in the art would appreciate that FIG. 4 illustrates one example of a switched capacitor converter circuit and that other implementations are possible without departing from the scope of the invention.

Figure 5:
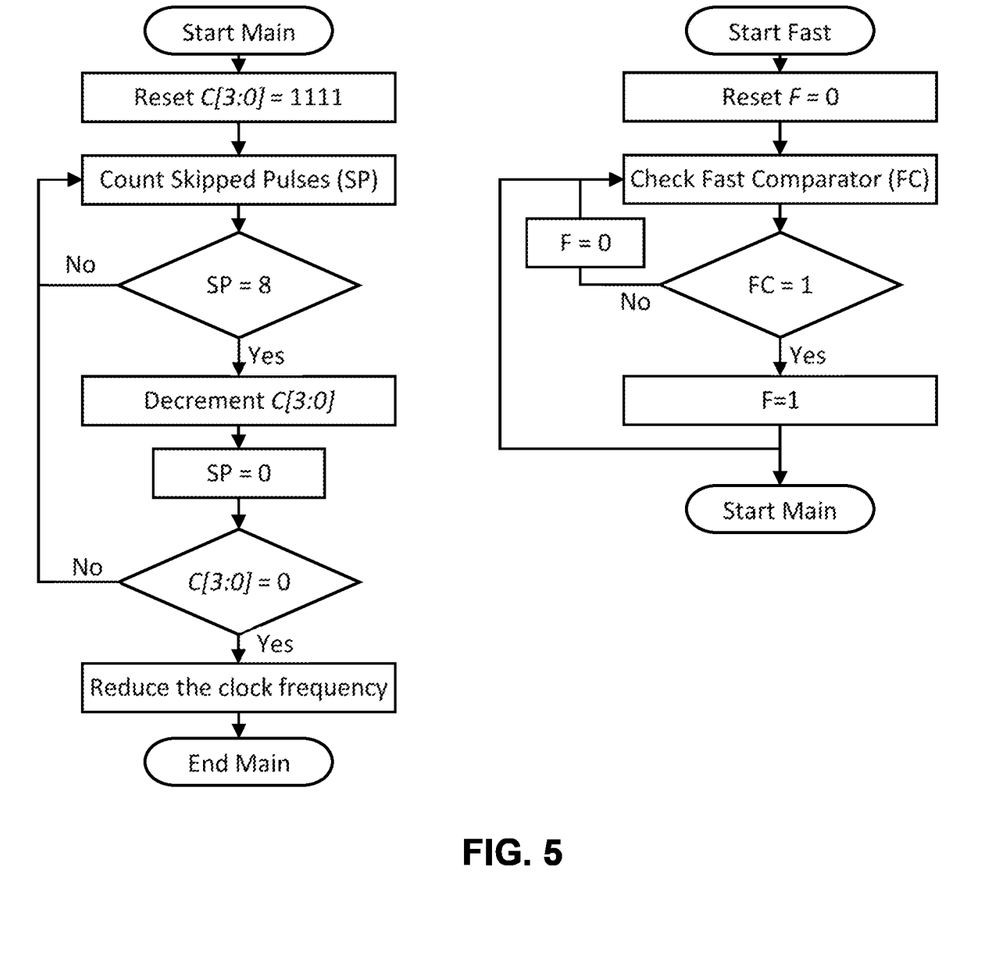
FIG. 5 shows an exemplary flow chart for a digital controller operation that can be used in a dual-loop regulated switched-capacitor converter in accordance with one embodiment of the invention.

With dual-loop regulations, embodiments of the invention can be operated to achieve efficiencies under different load conditions. FIG. 5 shows a possible flow chart for a digital controller that can be used in a dual loop regulated switched capacitor converter in accordance with embodiments of the invention. In this operation example, the main flow may start by resetting the digital word C[3:0] to 1111. This uses the maximum size switches for the switched capacitor converter. After that, the digital controller counts the skipped pulses (SP). When the number of the skipped pulses (SP) reaches 8, the digital word C[3:0] is decremented and a counter inside the digital controller is reset. If the C[3:0] has not reached 0000, the process is repeated. If the all-zero state is reached, which means that the load is very small or the input is very high, the digital controller may reduce the frequency to improve the power efficiency. The controller then stops at this state until the fast comparator resets it. The digital controller is always monitoring the fast comparator, and if a HIGH is issued, it asserts the digital signal F to HIGH enabling the extra-large switched capacitor array. It also resets the main flow. This continues until the fast comparator goes LOW.

Figure 6:
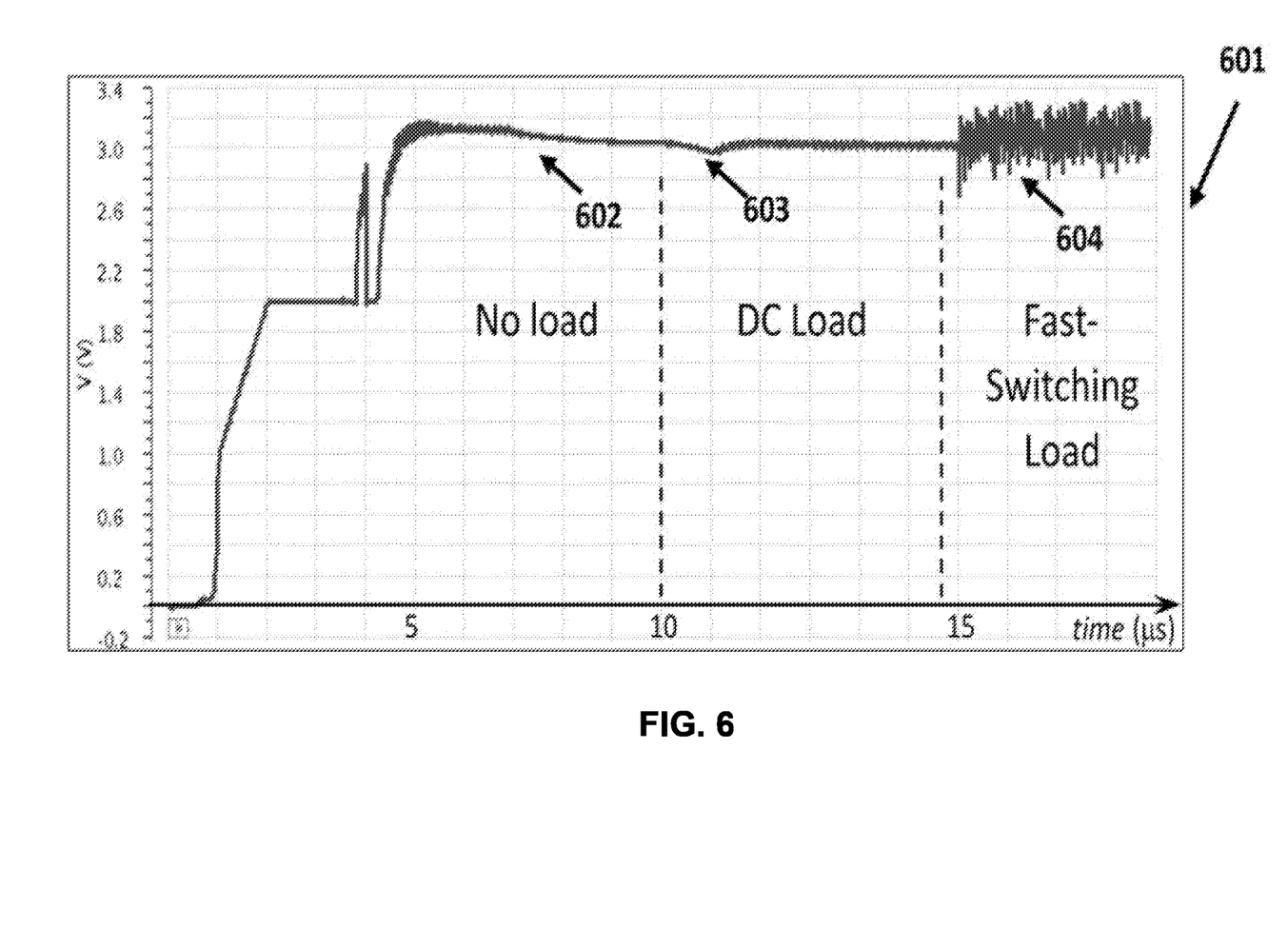
FIG. 6 shows a simulated output voltage of a dual-loop regulated switched-capacitor converter in accordance with one embodiment of the invention.

With such a dual loop regulated switched capacitor converter, the overall output voltages can be regulated within a desired range with low voltage ripples and high power efficiencies. FIG. 6 shows an exemplary simulated output voltage of the dual loop regulated switched capacitor converter circuit of FIG. 3 with respect to time. Plot (601) shows the output voltage in 3 different regions: no load (602), a constant load (603), and a fast switching load (604). In the first region (602), it can be observed how the level is periodically reducing due to the reduction of the digital word C[3:0]. It is clear that at the end of the region, the frequency is reduced as can be observed from the longer time needed for voltage level changes. When the load was applied in region (603), the digital controller was reset, and the internal counter started counting down again. For fast transients, the signal F toggles with the load current changes causing large variations at the output that is necessary to supply the required large load current. As shown in FIG. 6, overall the output voltage is regulated within the desired limits with low voltage ripples in DC load and good power efficiencies.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A dual loop regulated switched-capacitor converter circuit, comprising:
   a switched capacitor array that comprises a plurality of switches and capacitors;
   a digital controller for controlling the switched capacitor array;
   a pulse modulator connected to the digital controller;
   a clock generator connected to the digital controller;
   a first comparator connected to the pulse modulator; and
   a feedback network connected to the first comparator.

2. The dual loop regulated switched-capacitor converter circuit of claim 1,
   wherein the plurality of switches in the switched capacitor array are implemented as NMOS or PMOS transistors, or NPN or PNP bipolar transistors, or NMOS or PMOS FinFET transistors, or a combination thereof.

3. The dual loop regulated switched-capacitor converter circuit of claim 1,
   wherein the plurality of capacitors of the switched capacitor array are implemented with transistors, or metal-oxide-metal (MOM) or metal-insulator-metal (MIM) capacitors, or a combination thereof.

4. The dual loop regulated switched-capacitor converter of claim 1,
   wherein the switched capacitor array uses a single-phase clock or a multiple-phase clock.

5. The dual loop regulated switched-capacitor converter circuit of claim 1,
   wherein the pulse modulator is used to disable a clock signal to the switched capacitor array when an output voltage is higher than a desired output value.

6. The dual loop regulated switched-capacitor converter circuit of claim 1,
   wherein the pulse modulator is a pulse skipping modulator, a pulse frequency modulator, or a pulse width modulator.

7. The dual loop regulated switched-capacitor converter circuit of claim 1,
   wherein the pulse modulator is a pulse skipping modulator and the digital controller is used to enable or disable different units in the plurality of switches and capacitors in the switched capacitor array based on a number of skipped pulses of the pulse modulator using a multi-bit digital word.

8. The dual loop regulated switched-capacitor converter circuit of claim 1,
   wherein the digital controller can be used to change a frequency of the clock.

9. The dual loop regulated switched-capacitor converter circuit of claim 1,
   wherein the clock generator is used to generate a desired clock signal and its phase.

10. The dual loop regulated switched-capacitor converter circuit of claim 1,
    wherein the clock generator consists of an oscillator and a multi-phase clock generation circuit.

11. The dual loop regulated switched-capacitor converter circuit of claim 1,
    wherein the comparator is used to compare a scaled version of an output voltage and a reference voltage.

12. The dual loop regulated switched-capacitor converter circuit of claim 1,
    wherein the comparator can be clocked or not.

13. The dual loop regulated switched-capacitor converter circuit of claim 1,
    wherein the comparator can use an internal or external reference voltage.

14. The dual loop regulated switched-capacitor converter circuit of claim 1,
    wherein the comparator generates a signal to be used by the pulse modulator to determine the number of skipped pulses.

15. The dual loop regulated switched-capacitor converter circuit of claim 1,
    wherein the feedback network generates a voltage proportional to an output voltage.

16. The dual loop regulated switched-capacitor converter circuit of claim 1,
    wherein the feedback network can be implemented using resistors, capacitors, transistors or any combination of them.

17. The dual loop regulated switched-capacitor converter circuit of claim 1,
    wherein the feedback network can be implemented on-chip or off-chip.

18. The dual-loop regulated switched-capacitor converter circuit of claim 1, further comprising:
    a second comparator connected to the digital controller.

19. The dual-loop regulated switched-capacitor converter circuit of claim 18,
    wherein the switched capacitor array further comprises a large switched capacitor array unit to be used for heavy load transients.

20. The dual-loop regulated switched-capacitor converter circuit of claim 19,
    wherein the digital controller uses a dedicated digital signal to enable or disable the large switched capacitor array unit when large output load transients exist.

21. The dual-loop regulated switched-capacitor converter circuit of claim 19,
    wherein the first comparator compares a first scaled version of an output voltage and a first reference voltage and the second comparator compares a second scaled version of the output voltage and a second reference voltage,
    wherein the first scaled version of the output voltage is identical to the second scaled version of the output voltage, and the second reference voltage is lower than the first reference voltage, or
    wherein the first scaled version of the output voltage is smaller than the second scaled version of the output voltage, and the second reference voltage is identical to the first reference voltage.

22. The dual-loop regulated switched-capacitor converter circuit of claim 19,
    wherein the second comparator generates a signal to be used by the digital controller to enable the large switched capacitor array unit.

23. The dual-loop regulated switched-capacitor converter circuit of claim 18, further comprising:
    a third comparator connected to the digital controller.

24. The dual-loop regulated switched-capacitor converter circuit of claim 23,
    wherein the switched capacitor array further comprises a second large switched capacitor array unit of a different size to be used for a different heavy load transient.

* * * * *